United States Patent [19]

Sutton, Jr.

[11] Patent Number: 4,986,469
[45] Date of Patent: Jan. 22, 1991

[54] METHOD OF VENTILATING AN ANIMAL ENCLOSURE IN RESPONSE TO TEMPERATURE

[76] Inventor: James A. Sutton, Jr., 816 Henkel Rd., Statesville, N.C. 28677

[21] Appl. No.: 543,468

[22] Filed: Jun. 26, 1990

[51] Int. Cl.$^5$ ............................................. G05D 23/13
[52] U.S. Cl. ................................... 236/49.3; 98/33.1; 165/16
[58] Field of Search ............... 98/33.1; 236/49.1, 49.3; 165/16

[56] References Cited

U.S. PATENT DOCUMENTS

| | | | |
|---|---|---|---|
| 2,489,515 | 11/1949 | Blake et al. | 98/33.1 |
| 2,995,077 | 8/1961 | Kitson | 98/33.1 |
| 3,000,290 | 9/1961 | Rodick et al. | 98/33.1 |
| 3,285,153 | 11/1966 | Hartsongh | 98/33.1 |
| 3,915,377 | 10/1975 | Sutton, Jr. | 98/33.1 X |
| 4,113,175 | 9/1978 | Sutton, Jr. | 98/33.1 X |
| 4,184,538 | 1/1980 | Ravenhorst | 98/33.1 X |
| 4,428,278 | 1/1984 | Sutton, Jr. | 98/33.1 |
| 4,602,739 | 7/1986 | Sutton, Jr. | 236/46 F |
| 4,776,385 | 10/1988 | Dean | 236/49.3 X |

Primary Examiner—William E. Tapolcai
Attorney, Agent, or Firm—W. Thad Adams, III

[57] ABSTRACT

A method of ventilating an animal enclosure such as a poultry house which permits alternating use of powered sidewall ventilation, natural sidewall ventilating and powered tunnel ventilation dependant upon outside temperature, with automatic control of the ventilation devices to insure safe and effective use.

At and below a predetermined low outside ambient temperature, sidewall ventilation exhaust fans are operated to exhaust air drawn into the animal enclosure through the sidewall ventilation openings while tunnel ventilation openings are closed and tunnel ventilation fans are disabled to achieve a relatively low level of powered air movement through the animal enclosure.

Between a predetermined middle range of outside ambient temperature, the sidewall ventilation openings are opened while disabling both sidewall ventilation exhaust fans and tunnel ventilation exhaust fans to achieve natural cross-ventilation through the animal enclosure.

At and above a predetermined high range of outside ambient temperature, the sidewall ventilation openings are closed, the sidewall ventilation exhaust fans are disabled, the tunnel ventilation openings are opened and the tunnel ventilation exhaust fans are operated to achieve a relatively high level of powered air movement through the animal enclosure.

25 Claims, 9 Drawing Sheets

METHOD OF VENTILATING AN ANIMAL ENCLOSURE IN RESPONSE TO TEMPERATURE

TECHNICAL FIELD AND BACKGROUND OF THE INVENTION

This invention relates to a method of ventilating an animal enclosure according to the outside ambient temperature. Applicant's U.S. Pat. No. 4,602,739 discloses an Apparatus and Method for Ventilating Animal Enclosures which relies on a variation in fan operation intervals in response to outside air temperature changes to maintain proper ventilation within an animal enclosure. The explanation of the importance of proper ventilation contained in the Patent is incorporated herein. The invention disclosed in this application is a further improvement in controlling ventilation efficiency during relatively wide ranges of outside ambient temperature change.

This invention relates particularly to enclosures used to raise poultry, particularly chickens and turkeys. Modern day poultry houses are usually well insulated and are equipped with some type of ventilation system to minimize heat buildup in the house and to exchange inside air laden with products of animal respiration and waste with fresh, outside air. In the southern United States, the open walled house with adjustable curtains is typical. This type of poultry house is shown in Applicant's U.S. Pat. Nos. 3,915,377, 4,113,175 and 4,602,739.

The use of sidewall curtains permits natural ventilation when temperature conditions permit. In cold weather the curtains can be closed and powered fans used to more carefully control temperature and air exchange rates within the house. This type of ventilation is carried out with sidewall fans spaced along the length of the enclosure. Air is pulled into the house along one side and exhausted on the other side through the ventilation fans. When the outside temperature exceeds 80 degrees, common practice is to remove the fans from the sidewalls and relocate them in the middle of the house. The end doors are opened and the fans are aimed to blow towards one end. Foggers are sometimes used to create a mist of water, thereby causing some evaporative cooling. This is a common method of providing supplemental natural ventilation.

A newer type of ventilation is "tunnel ventilation." This type of ventilation relies on relatively high air velocities within the house and is based on the observed fact that air movement decreases the effective temperature that an animal senses. This is referred to as a "windchill" effect and is most often used to adjust downwardly the temperature during very cold weather to take into account the sensation of the wind in combination with the temperature on the skin.

To the extent that movement of air can decrease the effective temperature sensed by an animal, stress upon the animal can reduced below that which would result at the same temperature with no or a lesser velocity of air movement.

Without the use of "tunnel" ventilation, cooling is the greatest near the hanging fans in the middle of the house. The poultry tend to gather in front of the fans and away from the ends of the house. Overcrowding can cause heat and carbon dioxide buildup, thereby negating the desired effect of the fans and the mist.

SUMMARY OF THE INVENTION

Therefore, it is an object of the invention to provide a method of ventilating an animal enclosure such as a poultry house in such a way as to maximize productivity and minimize energy costs.

It is another object of the invention to provide a method of ventilating an animal enclosure such as a poultry house which permits alternating use of powered sidewall ventilation, natural sidewall ventilation and powered tunnel ventilation dependant upon outside temperature, with automatic control of the ventilation devices to insure safe and effective use.

These and other objects of the present invention are achieved in the preferred embodiments disclosed below by providing a method of ventilating an animal enclosure through a wide range of temperature variations to maximize production efficiency and minimize physiological stress in animals. The method comprises the steps of providing an animal enclosure having opposed sidewalls and opposed endwalls, sidewall ventilation exhaust fans positioned in the sidewalls of the animal enclosure, sidewall ventilation openings positioned in the sidewalls of the animal enclosure and including means for closing the sidewall ventilation openings against the passage of air therethrough, tunnel ventilation exhaust fans positioned in one end of the animal enclosure, tunnel ventilation openings proximate the other end of the animal enclosure and including means for closing the tunnel ventilation openings against the passage of air therethrough and automatic means for sensing outside ambient temperature and controlling the operation of the sidewall ventilation exhaust fans and tunnel ventilation exhaust fans responsive to the sensed temperature.

At and below a predetermined outside ambient temperature, the sidewall ventilation exhaust fans are operated to exhaust air drawn into the animal enclosure through the sidewall ventilation openings while the tunnel ventilation openings are closed and the tunnel ventilation fans are disabled to achieve a relatively low level of powered air movement through the animal enclosure.

Above the predetermined outside ambient temperature, the sidewall ventilation openings are closed, the sidewall ventilation exhaust fans are disabled, the tunnel ventilation openings are opened and the tunnel ventilation exhaust fans are operated to achieve a relatively high level of powered air movement through the animal enclosure.

According to another preferred embodiment of the invention, at and below a predetermined low outside ambient temperature, the sidewall ventilation exhaust fans are operated to exhaust air drawn into the animal enclosure through the sidewall ventilation openings while the tunnel ventilation openings are closed and the tunnel ventilation fans are disabled to achieve a relatively low level of powered air movement through the animal enclosure.

Between a predetermined middle range of outside ambient temperature, the sidewall ventilation openings are opened while disabling both sidewall ventilation exhaust fans and tunnel ventilation exhaust fans to achieve natural cross-ventilation through the animal enclosure.

At and above a predetermined high range of outside ambient temperature, the sidewall ventilation openings are closed, the sidewall ventilation exhaust fans are disabled, the tunnel ventilation openings are opened and the tunnel ventilation exhaust fans are operated to achieve a relatively high level of powered air movement through the animal enclosure.

According to one preferred embodiment of the invention, the method includes the step of placing the tunnel ventilation fans in one of the endwalls of the animal enclosure.

According to another preferred embodiment of the invention, the method includes the step of placing the tunnel ventilation fans in at least one of the sidewalls of the animal enclosure adjacent one of the endwalls thereof.

According to yet another preferred embodiment of the invention, the means for closing the sidewall ventilation openings comprises vertically adjustable sidewall curtains for opening and closing the sidewall ventilation openings.

Preferably, the low outside ambient temperature is approximately 60 degrees and the high outside ambient temperature is approximately 80 degrees.

According to one preferred embodiment of the invention, the tunnel ventilation openings are positioned in the sidewalls of the animal enclosure on the end of the animal enclosure remote from the tunnel ventilation exhaust fans.

According to another preferred embodiment of the invention, the tunnel ventilation openings are positioned in the endwalls of the animal enclosure remote from the tunnel ventilation exhaust fans.

Preferably, the sidewall ventilation openings include vents positioned near the top of the sidewalls along the length of the animal enclosure.

According to one preferred embodiment of the invention, the step of providing a temperature sensor for monitoring the outside ambient temperature and automatically selecting activating steps (b), (c) and (d) based upon the sensed outside ambient temperature.

According to another preferred embodiment of the invention, the step of placing the tunnel ventilation fans in at least one of the sidewalls of the animal enclosure comprises placing a plurality of tunnel ventilation fans in the opposing sidewalls opposite each other adjacent one end of the animal enclosure.

Preferably, the tunnel ventilation according to step (d) is sufficient to provide a 4.5 to 7.5 feet per second air current throughout the length and width of the animal enclosure.

According to yet another preferred embodiment of the invention, the method includes the step of introducing a water mist into the animal enclosure during step (d) to provide evaporative cooling within the animal enclosure.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Description of Poultry House

Figure 1:
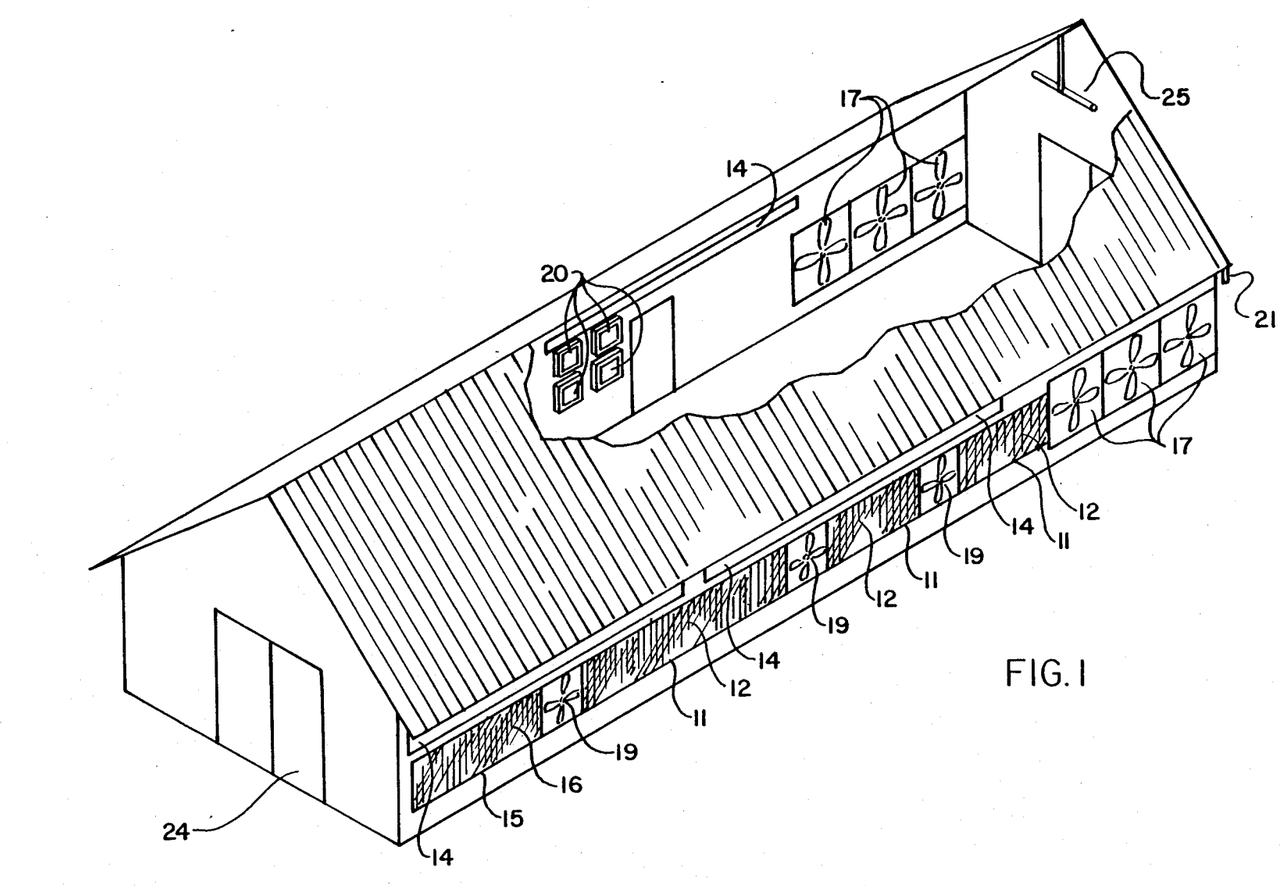
FIG. 1 is a perspective view of a poultry house according to the method of the invention.

Referring now specifically to the drawings, a poultry house of the type used to practice the method according to the present invention is illustrated in FIG. 1 and shown generally at reference numeral 10. Poultry house 10 is a relatively low, long enclosure with an open sidewalls 11 along one side. The open sidewalls are equipped with adjustable curtains 12 of the type which are mounted below the opening and which are raised to cover the opening. The curtains 12 are held in the raised, closed position and a winch or some similar device and are controlled electrically to fall open to provide supplemental emergency ventilation should power to the ventilation fans fail. Such a device is disclosed in Applicant's U.S. Pat. Nos. 3,915,377 and 4,113,175.

House 10 also includes a series of air vents 14 positioned along the top of the sidewalls of the house 10. These vents 14 may be intermittent, as shown, or they may be continuous.

An opening 15 covered by curtains 16 adjacent one end of house 10 operates in conjunction with a series of tunnel ventilation fans 17, as is also shown in FIG. 1.

Sidewall ventilation fans 19 are mounted in the sidewall of house 10 between adjacent sidewall openings 11.

Tunnel ventilation fans 17, sidewall ventilation fans 19, curtains 12 and curtains 16 are all electrically connected to a ventilation control apparatus 20 which is programmed to control each of these elements based upon the outside ambient temperature sensed by a temperature sensor 21 mounted at some suitable exterior location. A control apparatus suitable for use is a "Kinox Cruise" manufactured by Pro-Tech, Inc. and covered by U.S. Pat. No. 4,602,739.

Description of Ventilation Method

The house 10 as described above functions in three distinct modes depending upon ambient outside temperature.

Figure 2A:
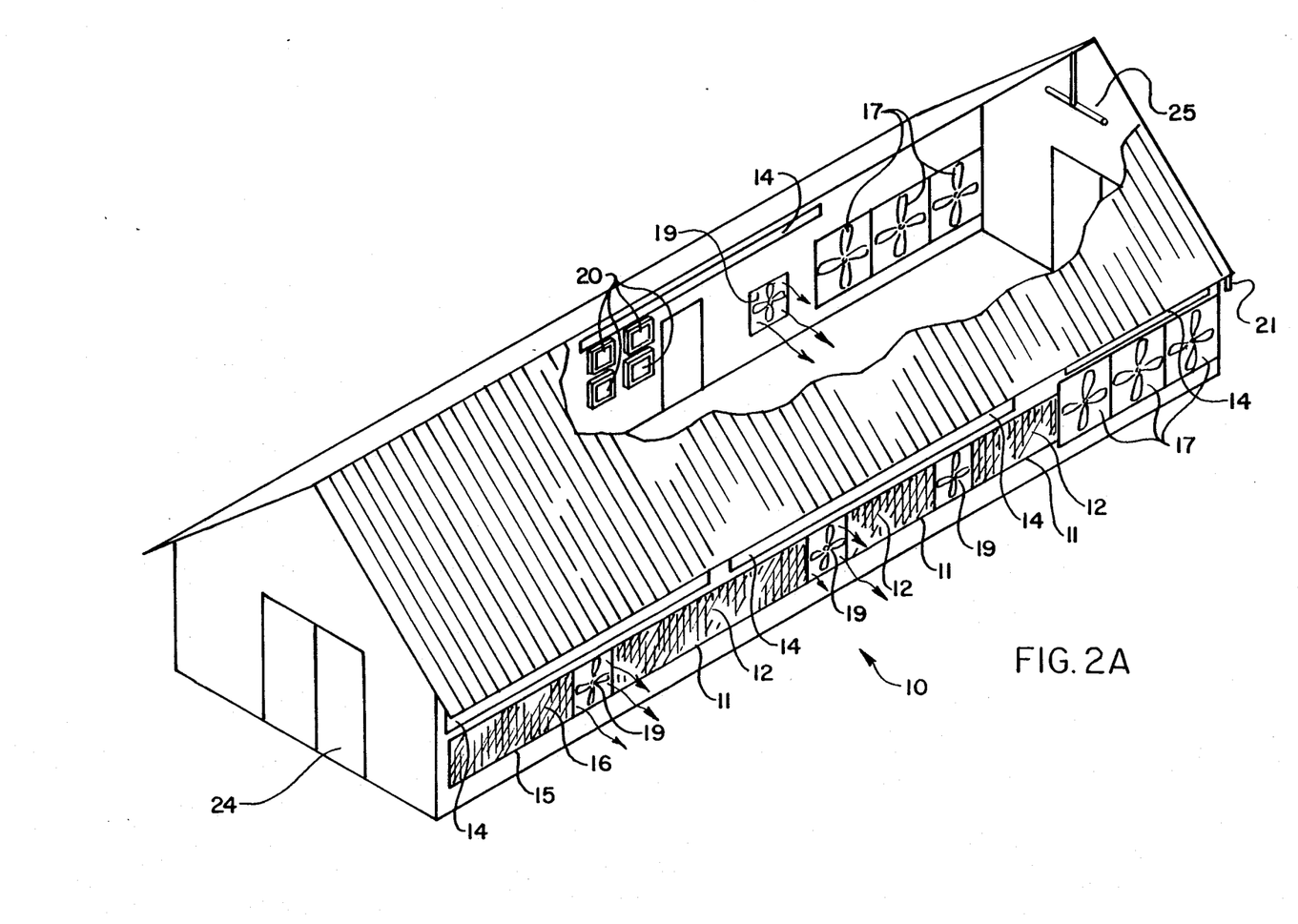
FIGS. 2A and 2B are perspective and top plan views of the poultry house according to the sidewall fan ventilation step of the method.
Figure 2B:
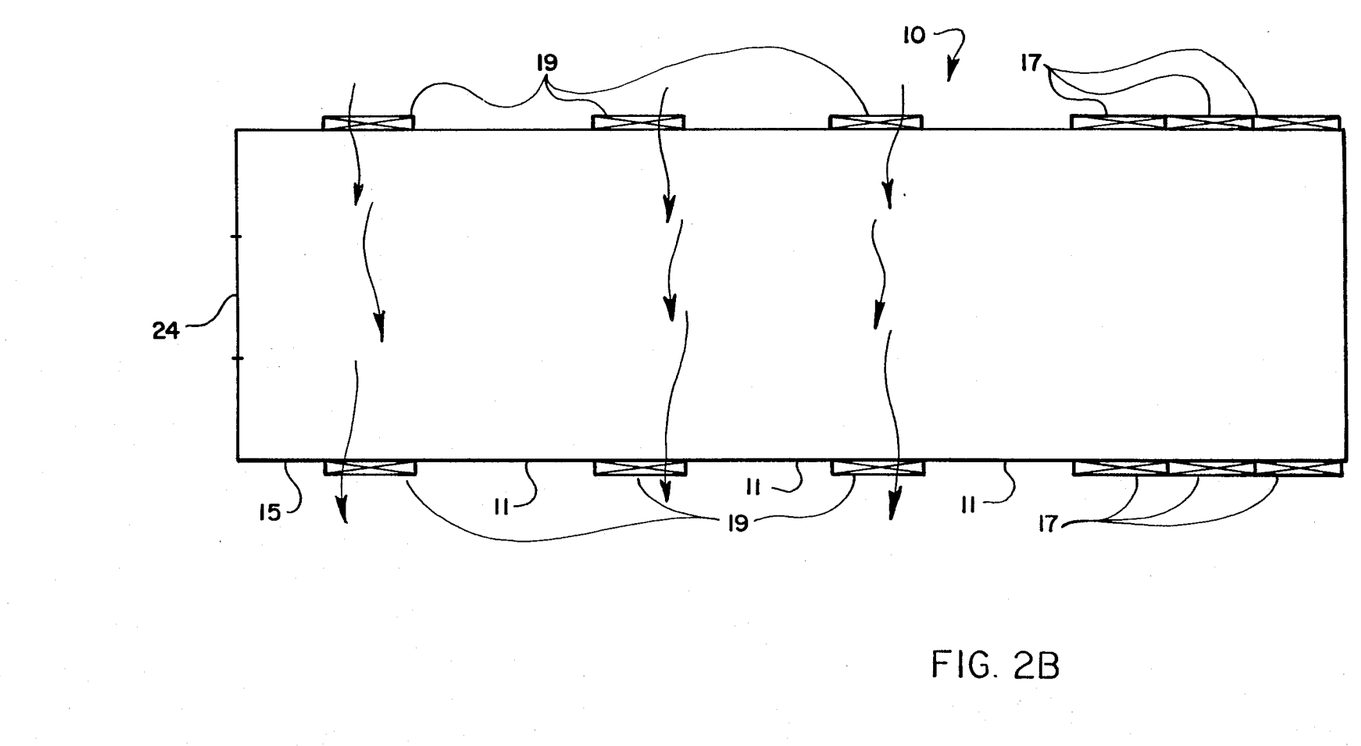

Low Temperature Forced Sidewall Ventilation Mode (FIGS. 2A, 2B)

At relatively low temperatures on the order of 60-65 degrees F. and below, sidewall fans 19 operate to exhaust air from the house 10 and draw in fresh air. Air is drawn in through vents 14, thereby providing sufficient cross-ventilation. The ventilation pattern is illustrated in FIG. 2B. With the use of a control apparatus 20 such as the Kinox Cruise, the minimum ventilation fans 19 operate at an interval the span of which is controlled by the temperature outside the house 10. Generally, the higher the temperature the higher the level of moisture in the air and the higher the rate at which it must be exchanged to maintain proper, healthful conditions within house 10. A high temperature override based upon the inside temperature can be used to increase the run time of the fans 19 and/or open the curtains 12 and 16 should the temperature inside the house 10 exceed the permitted range. The control apparatus 20 is also maintains the curtains 12 and 16 in a raised position covering the sidewall openings 11 and 15. Should the power fail, the curtains 12 and 16 are released, permitting them to fall open and thereby provide emergency ventilation. In this mode, tunnel fans 17 are disabled and do not operate.

Figure 3A:
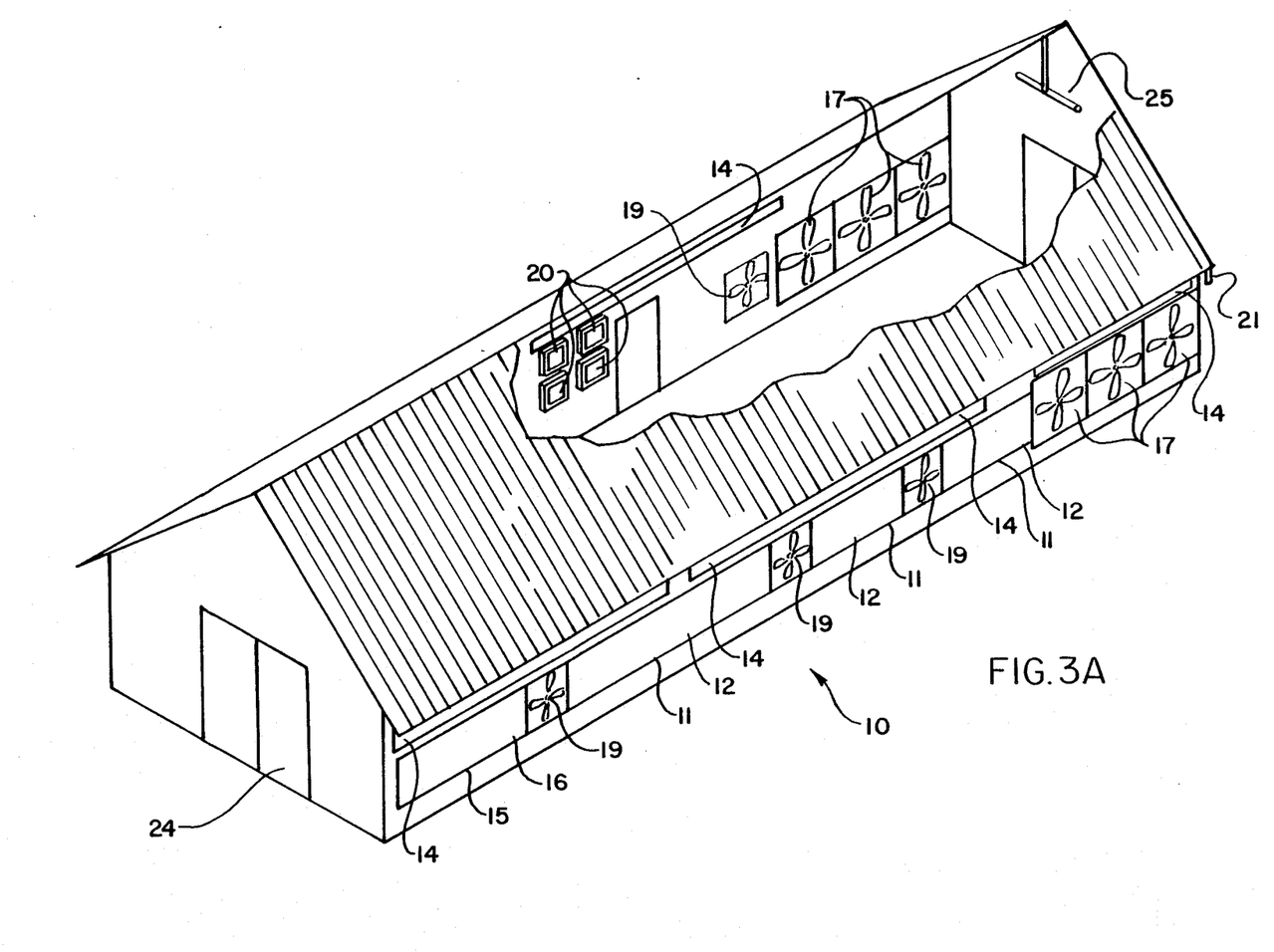
FIGS. 3A and 3B are perspective and top plan views of the poultry house according to the open sidewall natural ventilation step of the method.
Figure 3B:
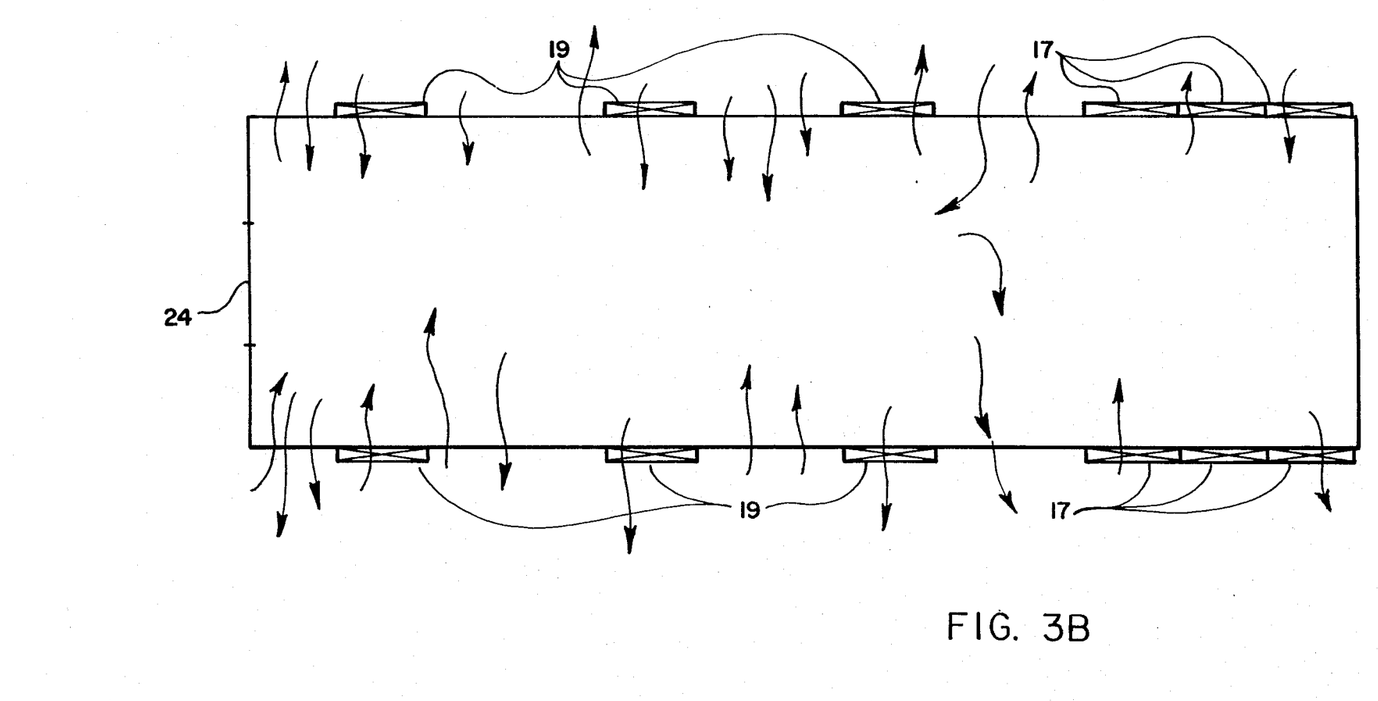

Moderate Temperature Natural Ventilation Mode (FIGS. 3A, 3B)

As the outside temperature reaches about 60–65 degrees F., the moisture holding content of the air is sufficient to permit natural ventilation. In this mode, power consumption is reduced by lowering curtains 12 and 16 away from the sidewall openings 11 and 15. Natural cross-ventilation occurs as warm, moist air rises in house 10 and exits through one side vent 14 and is replaced by an intake of fresh air through the other sidewall openings 11 and 15. See FIG. 3B. If desired, one fan 19 can be left running as a safely precaution and the curtains can be lowered to a predetermined level less than completely open as is desired to maintain temperatures within acceptable ranges. All of these steps are performed automatically be control apparatus 20.

Should the power fail, the curtains 12 and 16 are released to a full lowered position if not already there to thereby provide emergency ventilation. In the natural ventilation mode, tunnel fans 17 are disabled and do not operate.

Figure 4A:
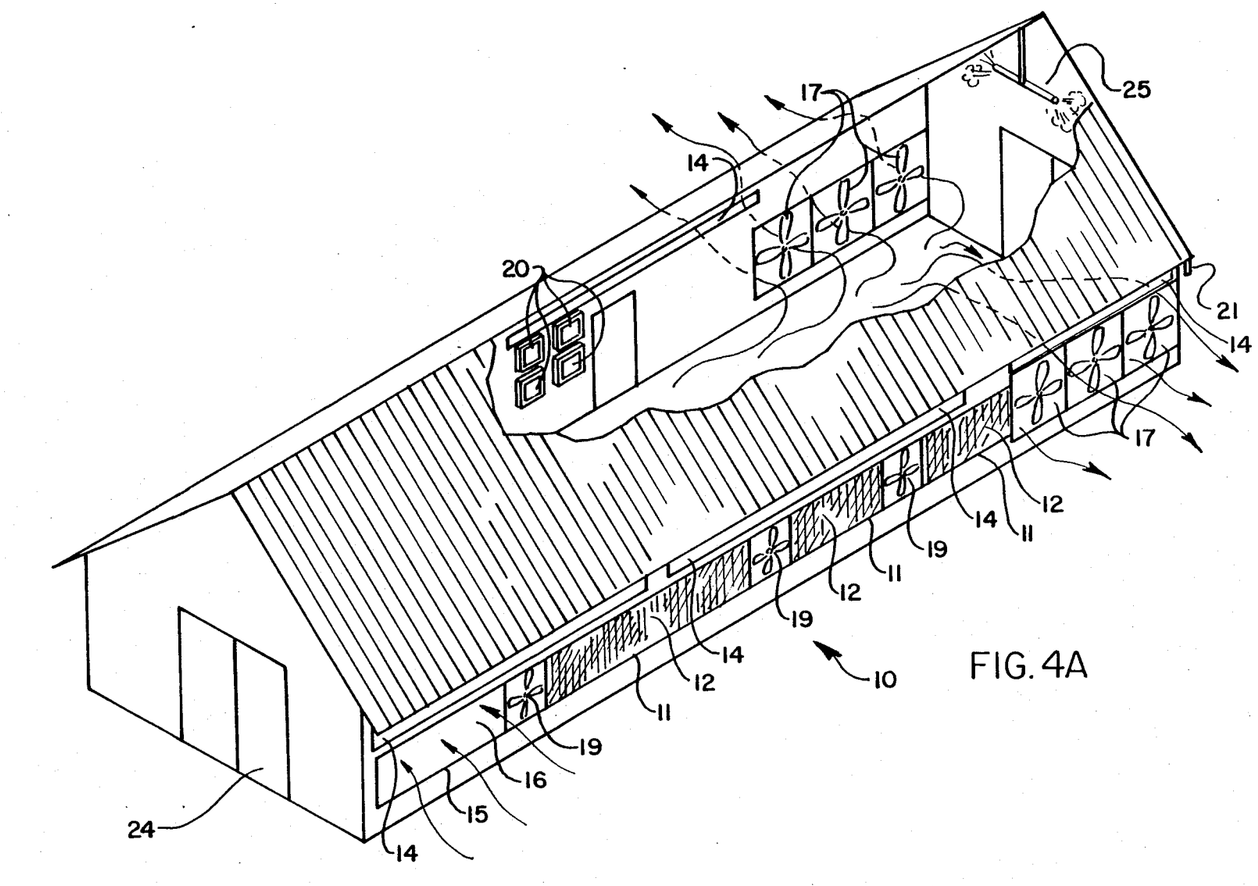
FIGS. 4A and 4B are perspective and top plan views of the poultry house according to the tunnel fan ventilation step of the method.
Figure 4B:
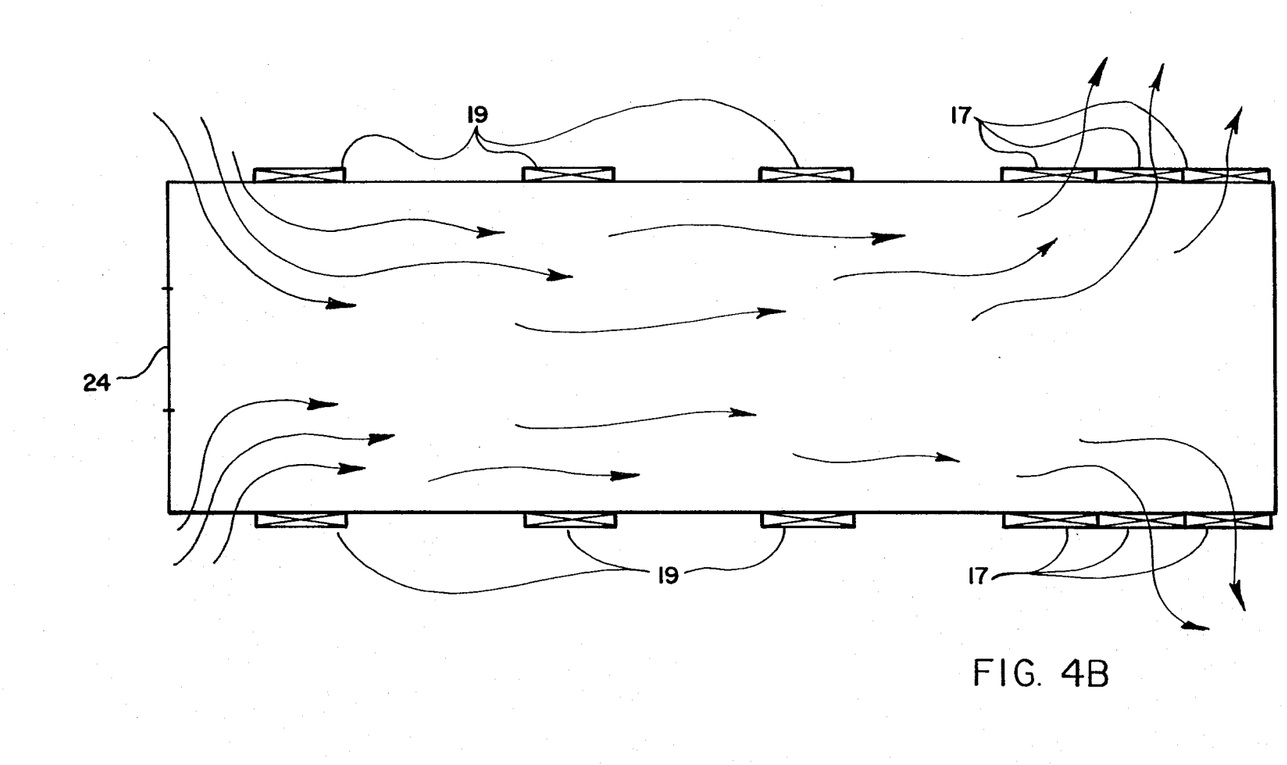

High Temperature Tunnel Ventilation Mode (FIG. 4A, 4B)

At about 80 degrees F. natural ventilation becomes inadequate to provide sufficient replacement of contaminated air. In addition, the heat itself on the poultry creates physiological stress which is manifested in an excessive respiration rate, rapid accumulation of carbon dioxide, decreased feed utilization efficiency and, in extreme cases, death. For this reason, tunnel ventilation is desirable.

At 80 degrees F. or any other desired setting, control apparatus 20 closes curtains 12 by raising them completely over the sidewall openings 11. Curtains 16 are lowered to the full open position and tunnel ventilation fans 17 are turned on by control apparatus 20. Relatively high velocity air is therefore pulled into house 10 through openings 15, moved along the length of house 10 and is exhausted through the tunnel ventilation fans 17 on the extreme opposite ends of the house 10. In effect, a "wind chill" is created, causing the poultry to sense a lower effective temperature than that indicated by a thermometer. Of course, the relatively high velocity air—on the order of 4.5 to 7.5 feet per second—also effectively removes contaminated air. In general, an complete change of air is desired every minute. The required fan capacity is determined by finding the product of the velocity and the cross-sectional area of the house 10. For example, to achieve a velocity of 6 feet per second (350 feet per minute) in a poultry house 40 feet wide and 12 feet high approximately 168,000 cubic feet per minute of air must be moved. Ideally, the area of sidewall openings 15 should be comparable to the cross-section of house 10.

Figure 5:
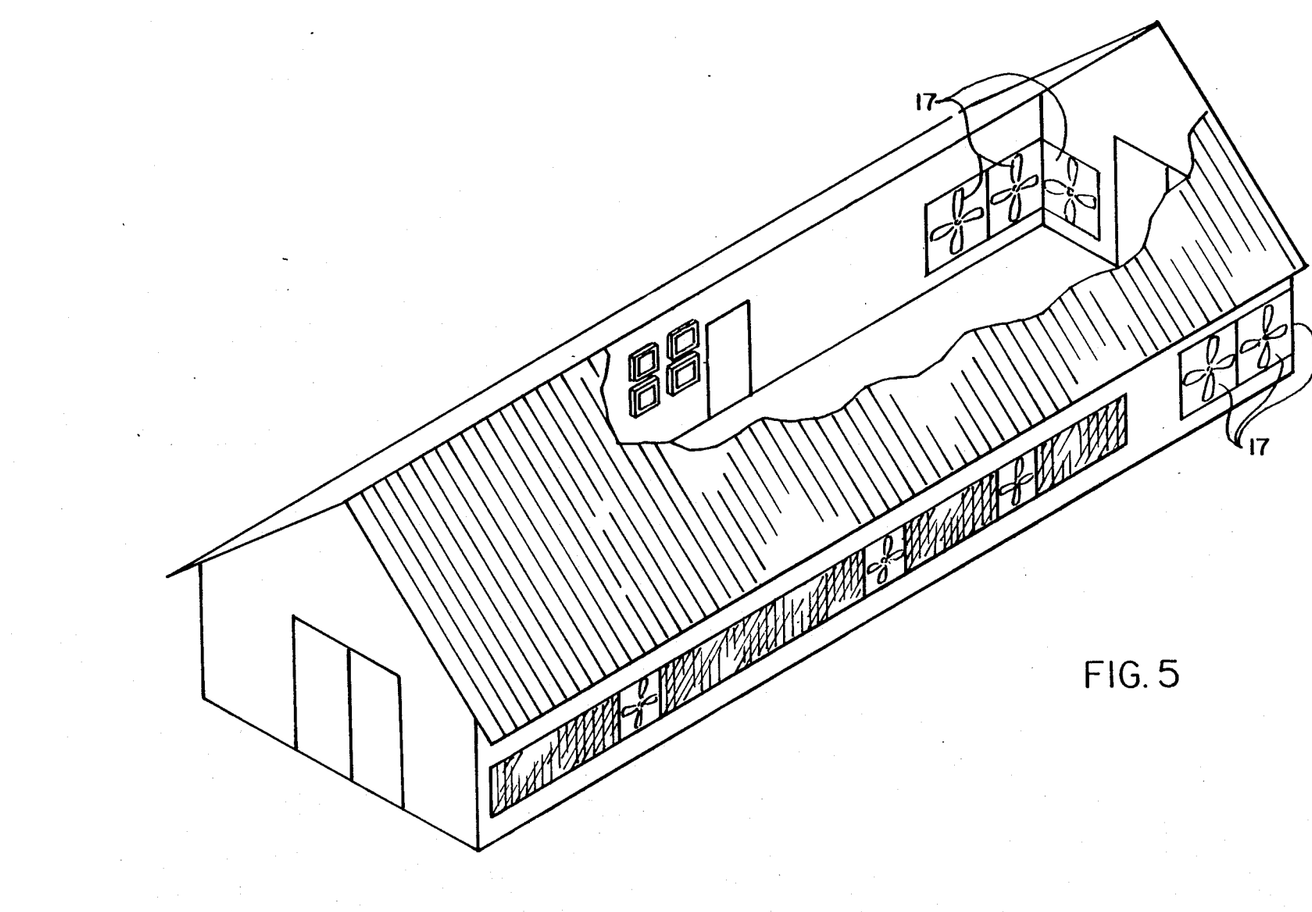
FIG. 5 is a perspective view showing the tunnel ventilation fans placed in the gable ends of the poultry house.
Figure 6:
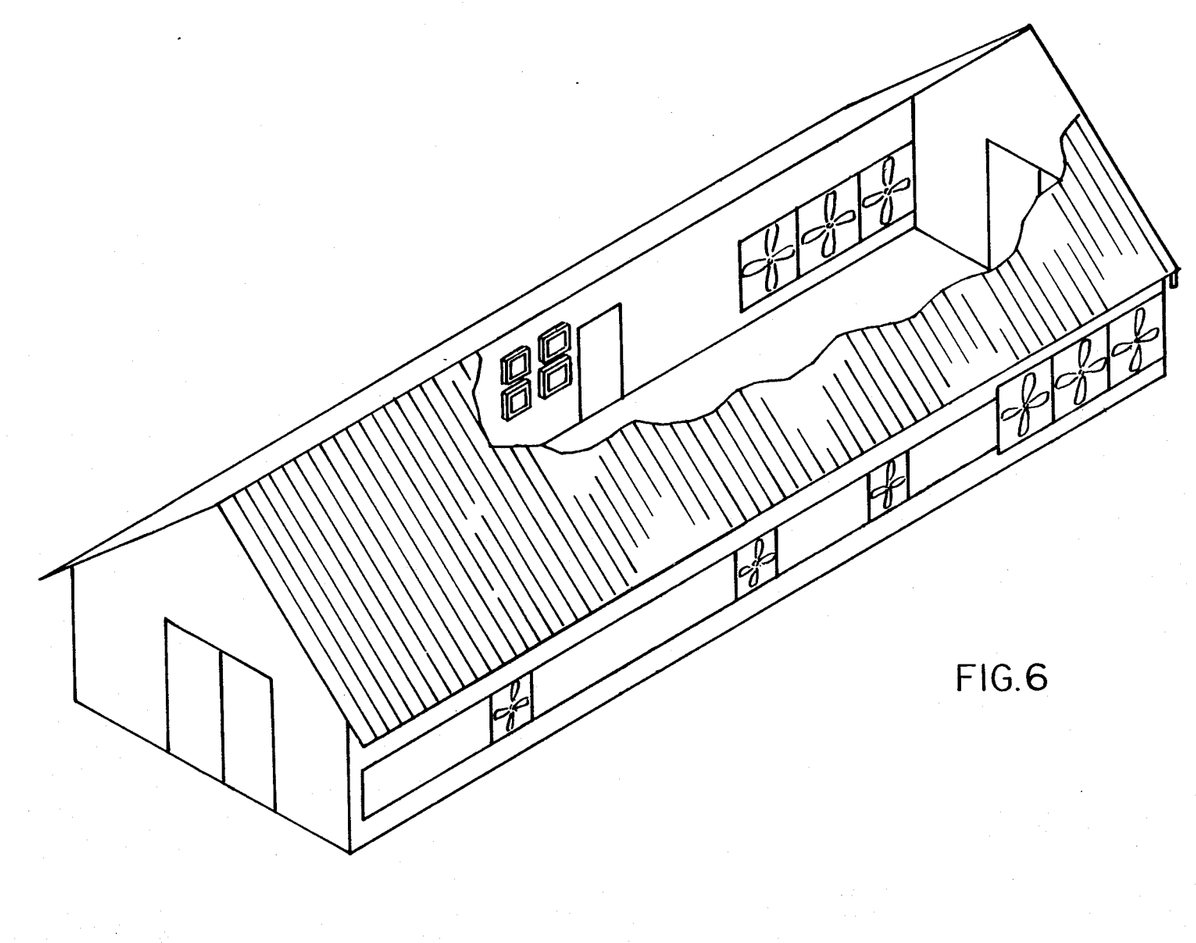
FIG. 6 is a perspective view of a poultry house wherein doors are used as tunnel ventilation inlets.

A number of variations are possible. Fans 17 can be placed as shown in FIG. 1 or all on one of the end walls of house 10, or some on the end wall and others on the closely adjacent side walls. See FIG. 5. Fans can also be placed high in one gable end of the house. See FIG. 6. In an appropriate case, an air inlet can be created by opening a large door 24 on the end of the house opposite the tunnel ventilation fans, as is also shown in FIG. 6.

Tunnel ventilation is most effective when combined with evaporative cooling. For this reason either foggers 25 or evaporative cooling pads (not shown) are preferably incorporated into the design of house 10 and comprise part of the method described in this application.

Due to the number of fans used in the embodiments disclosed above, it is desirable to stage the fans "ON" one or two at a time. This reduces stress on the utility company power transformer or standby generator. Fan motors draw 6 to 7 times more current during start up than at operating speed. Spreading out the load on the system increases reliability and reduces peak power consumption.

I claim:

1. A method of ventilating an animal enclosure through a wide range of temperature variations to maximize production efficiency and minimize physiological stress in animals, comprising the steps of:
    (a) providing an animal enclosure having:
        (ii) sidewall ventilation exhaust fans positioned in the sidewalls of the animal enclosure;
        (iii) sidewall ventilation openings positioned in the sidewalls of the animal enclosure and including means for closing said sidewall ventilation openings against the passage of air therethrough;
        (iv) tunnel ventilation exhaust fans positioned in one end of the animal enclosure; and
        (v) tunnel ventilation openings proximate the other end of the animal enclosure and including means for closing said tunnel ventilation openings against the passage of air therethrough;
        (vi) automatic means for sensing outside ambient temperature and controlling the operation of the sidewall ventilation exhaust fans and tunnel ventilation exhaust fans responsive to the sensed temperature:
    (b) at and below a predetermined low outside ambient temperature, operating said sidewall ventilation exhaust fans to exhaust air drawn into the animal enclosure through said sidewall ventilation openings while said tunnel ventilation openings are closed and said tunnel ventilation fans are disabled to achieve a relatively low level of powered air movement through the animal enclosure to provide both minimum ventilation and high temperature control;
    (c) between a predetermined middle range of outside ambient temperature, opening the sidewall ventilation openings while disabling both sidewall ventilation exhaust fans and tunnel ventilation exhaust fans to achieve natural cross-ventilation through the animal enclosure; and
    (d) at and above a predetermined high range of outside ambient temperature, closing the sidewall ventilation openings, disabling the sidewall ventilation exhaust fans, opening the tunnel ventilation openings and operating the tunnel ventilation exhaust fans to achieve a relatively high level of powered air movement through the animal enclosure.

2. A method of ventilating an animal enclosure according to claim 1, wherein said method includes the step of placing the tunnel ventilation fans in one of the endwalls of said animal enclosure.

3. A method of ventilating an animal enclosure according to claim 1, wherein said method includes the step of placing the tunnel ventilation fans in at least one of the sidewalls of said animal enclosure adjacent one of the endwalls thereof.

4. A method of ventilating an animal enclosure according to claim 1, wherein said means for closing said sidewall ventilation openings comprises vertically adjustable sidewall curtains for opening and closing said sidewall ventilation openings.

5. A method of ventilating an animal enclosure according to claim 1, wherein said low outside ambient temperature is approximately 60 degrees and said high outside ambient temperature is approximately 80 degrees.

6. A method of ventilating an animal enclosure according to claim 1, wherein the tunnel ventilation openings are positioned in the sidewalls of the animal enclosure on the end of the animal enclosure remote from the tunnel ventilation exhaust fans.

7. A method of ventilating an animal enclosure according to claim 1, wherein the tunnel ventilation openings are positioned in the endwalls of the animal enclosure remote from the tunnel ventilation exhaust fans.

8. A method of ventilating an animal enclosure according to claim 1, wherein said sidewall ventilation openings include vents positioned near the top of the sidewalls along the length of the animal enclosure.

9. A method of ventilating an animal enclosure according to claim 1, and including the step of providing a temperature sensor for monitoring the outside ambient temperature and automatically selecting activating steps (b), (c) and (d) based upon the sensed outside ambient temperature.

10. A method of ventilating an animal enclosure according to claim 3, wherein the step of placing the tunnel ventilation fans in at least one of the sidewalls of said animal enclosure comprises placing a plurality of tunnel ventilation fans in the opposing sidewalls opposite each other adjacent one end of the animal enclosure.

11. A method of ventilating an animal enclosure according to claim 1, wherein tunnel ventilation according to step (d) is sufficient to provide a 4.5 to 7.5 feet per second air current throughout the length and width of the animal enclosure.

12. A method of ventilating an animal enclosure according to claim 1, and including the step of introducing a water mist into the animal enclosure during step (d) to provide evaporative cooling within the animal enclosure.

13. A method of ventilating an animal enclosure through a wide range of temperature variations to maximize production efficiency and minimize physiological stress in animals, comprising the steps of:
    (a) providing an animal enclosure having:
        (i) opposed sidewalls and opposed endwalls;
        (ii) sidewall ventilation exhaust fans positioned in the sidewalls of the animal enclosure;
        (iii) sidewall ventilation openings positioned in the sidewalls of the animal enclosure and including means for closing said sidewall ventilation openings against the passage of air therethrough;
        (iv) tunnel ventilation exhaust fans positioned in one end of the animal enclosure; and
        (v) tunnel ventilation openings proximate the other end of the animal enclosure and including means for closing said tunnel ventilation openings against the passage of air therethrough;
        (vi) automatic means for sensing outside ambient temperature and controlling the operation of the sidewall ventilation exhaust fans and tunnel ventilation exhaust fans responsive to the sensed temperature:
    (b) at and below a predetermined outside ambient temperature, operating said sidewall ventilation exhaust fans to exhaust air drawn into the animal enclosure through said sidewall ventilation openings while said tunnel ventilation openings are closed and said tunnel ventilation fans are disabled to achieve a relatively low level of powered air movement through the animal enclosure; and
    (c) above the predetermined outside ambient temperature, closing the sidewall ventilation openings, disabling the sidewall ventilation exhaust fans, opening the tunnel ventilation openings and operating the tunnel ventilation exhaust fans to achieve a relatively high level of powered air movement through the animal enclosure.

14. A method of ventilating an animal enclosure according to claim 13, wherein said method includes the step of placing the tunnel ventilation fans in one of the endwalls of said animal enclosure.

15. A method of ventilating an animal enclosure according to claim 13, wherein said method includes the step of placing the tunnel ventilation fans in at least one of the sidewalls of said animal enclosure adjacent one of the endwalls thereof.

16. A method of ventilating an animal enclosure according to claim 13, wherein said means for closing said sidewall ventilation openings comprises vertically adjustable sidewall curtains for opening and closing said sidewall ventilation openings.

17. A method of ventilating an animal enclosure according to claim 13, wherein said outside ambient temperature is approximately 80 degrees.

18. A method of ventilating an animal enclosure according to claim 13, wherein the tunnel ventilation openings are positioned in the sidewalls of the animal enclosure on the end of the animal enclosure remote from the tunnel ventilation exhaust fans.

19. A method of ventilating an animal enclosure according to claim 13, wherein the tunnel ventilation openings are positioned in the endwalls of the animal enclosure remote from the tunnel ventilation exhaust fans.

20. A method of ventilating an animal enclosure according to claim 13, wherein said sidewall ventilation openings include vents positioned near the top of the sidewalls along the length of the animal enclosure.

21. A method of ventilating an animal enclosure according to claim 13, and including the step of providing a temperature sensor for monitoring the outside ambient temperature and automatically selecting activating steps (b) and (c) based upon the sensed outside ambient temperature.

22. A method of ventilating an animal enclosure according to claim 15, wherein the step of placing the tunnel ventilation fans in at least one of the sidewalls of said animal enclosure comprises placing a plurality of tunnel ventilation fans in the opposing sidewalls opposite each other adjacent one end of the animal enclosure.

23. A method of ventilating an animal enclosure according to claim 13, wherein tunnel ventilation according to step (c) is sufficient to provide a 4.5 to 7.5 feet per second air current throughout the length and width of the animal enclosure.

24. A method of ventilating an animal enclosure according to claim 13, and including the step of introducing a water mist into the animal enclosure during step (c) to provide evaporative cooling within the animal enclosure.

25. A method of ventilating an animal enclosure according to claim 13, wherein said tunnel ventilation exhaust fans are progressively activated as temperature increases to create greater velocity and therefore greater comfort-inducing wind chill.

* * * * * a
REEXAMINATION CERTIFICATE (3837th)
United States Patent [19]
Sutton, Jr.

[11] B1 4,986,469
[45] Certificate Issued Aug. 17, 1999

[54] METHOD OF VENTILATING AN ANIMAL ENCLOSURE IN RESPONSE TO TEMPERATURE

[76] Inventor: James A. Sutton, Jr., 816 Henkel Rd., Statesville, N.C. 28677

Reexamination Request:
No. 90/005,040, Jul. 16, 1998

Reexamination Certificate for:
Patent No.: 4,986,469
Issued: Jan. 22, 1991
Appl. No.: 07/543,468
Filed: Jun. 26, 1990

[51] Int. Cl.$^6$ .................................................. G05D 23/13
[52] U.S. Cl. ....................... 236/49.3; 165/250; 454/239; 454/252
[58] Field of Search ...................... 236/49.1, 49.3; 454/239, 251, 252; 165/248, 250, 291

[56] References Cited

U.S. PATENT DOCUMENTS

| | | | |
|---|---|---|---|
| 2,489,515 | 11/1949 | Blake et al. | 98/33.1 |
| 2,995,077 | 8/1961 | Kitson | 98/33.1 |
| 3,000,290 | 9/1961 | Rodick et al. | 98/33.1 |
| 3,285,153 | 11/1966 | Hartsongh | 98/33.1 |
| 3,915,377 | 10/1975 | Sutton, Jr. | 98/33.1 X |
| 4,113,175 | 9/1978 | Sutton, Jr. | 98/33.1 X |
| 4,184,538 | 1/1980 | Ravenhorst | 98/33.1 X |
| 4,428,278 | 1/1984 | Sutton, Jr. | 98/33.1 |
| 4,602,739 | 7/1986 | Sutton, Jr. | 236/46 F |
| 4,776,385 | 10/1988 | Dean | 236/49.3 X |

OTHER PUBLICATIONS

Broiler Industry, Dec. 1987 [even pages 100–114] "Designing the environment for broiler grow–out" & "Field report: environmental housing".

Poultry Digest, Apr. 1988, pp. 160–163. "Understanding and selecting a computerized control system" Campbell.

1986 Poultry Science 65:253–257, Timmons et al, "Education and Production, Flexible Housing for Broiler Breeders".

Timmons et al, "The Flex House: A New Concept in Poultry Housing", 1983 Transactions of the ASAE pp. 529–532.

Timmons et al "A Plenum Concept Applied to Evaporative Pad Cooling for Broiler Housing", 1984 Trans. of the ASAE pp. 1877–1881.

Timmons et al. "Economic Optimization of Broiler Production" vol. 29(5), 1986 ASAE Paper No. 85–4547.

Timmons et al, Temperature Dependent Efficacy of Evaporative Cooling for Broilers, vol. 5(2) Jun. 1989 ASAE publication pp. 215–224.

"Prepare early for summer heat", Poultry Digest 1982 pp. 240–244.

"Modified broiler houses with evaporative cooling termed beneficial all year" Poultry Digest, Feb. 1986 p. 54 et seq.

*Primary Examiner*—William E. Tapolcai

[57] ABSTRACT

A method of ventilating an animal enclosure such as a poultry house which permits alternating use of powered sidewall ventilation, natural sidewall ventilating and powered tunnel ventilation dependant upon outside temperature, with automatic control of the ventilation devices to insure safe and effective use.

At and below a predetermined low outside ambient temperature, sidewall ventilation exhaust fans are operated to exhaust air drawn into the animal enclosure through the sidewall ventilation openings while tunnel ventilation openings are closed and tunnel ventilation fans are disabled to achieve a relatively low level of powered air movement through the animal enclosure.

Between a predetermined middle range of outside ambient temperature, the sidewall ventilation openings are opened while disabling both sidewall ventilation exhaust fans and tunnel ventilation exhaust fans to achieve natural cross-ventilation through the animal enclosure.

At and above a predetermined high range of outside ambient temperature, the sidewall ventilation openings are closed, the sidewall ventilation exhaust fans are disabled, the tunnel ventilation openings are opened and the tunnel ventilation exhaust fans are operated to achieve a relatively high level of powered air movement through the animal enclosure.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 13 are determined to be patentable as amended.

Claims 2–12 and 14–25, dependent on an amended claim, are determined to be patentable.

1. A method of [ventilating an animal enclosure through a wide range of] *maintaining temperature in an animal enclosure within a narrow predetermined optimal animal comfort range responsive to a wide range of sensed outside ambient* temperature variations to maximize production efficiency and minimize physiological stress in animals *housed within the enclosure*, comprising the steps of:

(a) providing an animal enclosure having:

[(ii)] (*i*) sidewall ventilation exhaust fans positioned in the sidewalls of the animal enclosure;

[(iii)] (*ii*) sidewall ventilation openings positioned in the sidewalls of the animal enclosure and including means for closing said sidewall ventilation openings against the passage of air therethrough;

[(iv)] (*iii*) tunnel ventilation exhaust fans positioned in one end of the animal enclosure; and

[(v)] (*iv*) tunnel ventilation openings proximate the other end of the animal enclosure and including means for closing said tunnel ventilation openings against the passage of air therethrough;

[(vi)] (*v*) automatic means for sensing outside ambient temperature and controlling the operation of the sidewall ventilation exhaust fans and tunnel ventilation exhaust fans responsive to the sensed temperature:

(b) at and below a predetermined low outside ambient temperature, operating said sidewall ventilation exhaust fans to exhaust air drawn into the animal enclosure through said sidewall ventilation openings while said tunnel ventilation openings are closed and said tunnel ventilation fans are disabled to achieve a relatively low level of powered air movement through the animal enclosure to provide both minimum ventilation and high temperature control;

(c) between a predetermined middle range of outside ambient temperature, opening the sidewall ventilation openings while disabling both sidewall ventilation exhaust fans and tunnel ventilation exhaust fans to achieve natural cross-ventilation through the animal enclosure; and (d) at and above a predetermined high range of outside ambient temperature, closing the sidewall ventilation openings, disabling the sidewall ventilation exhaust fans, opening the tunnel ventilation openings and operating the tunnel ventilation exhaust fans to achieve a relatively high level of powered air movement through the animal enclosure.

13. A method of [ventilating an animal enclosure through a wide range of] *maintaining temperature in an animal enclosure within a narrow predetermined optimal animal comfort range responsive to a wide range of sensed outside ambient* temperature variations to maximize production efficiency and minimize physiological stress in animals *housed within the enclosure*, comprising the steps of:

(a) providing an animal enclosure having:

(i) opposed sidewalls and opposed endwalls;

(ii) sidewall ventilation exhaust fans positioned in the sidewalls of the animal enclosure;

(iii) sidewall ventilation openings positioned in the sidewalls of the animal enclosure and including means for closing said sidewall ventilation openings against the passage of air therethrough;

(iv) tunnel ventilation exhaust fans positioned in one end of the animal enclosure; and (v) tunnel ventilation openings proximate the other end of the animal enclosure and including means for closing said tunnel ventilation openings against the passage of air therethrough;

(vi) automatic means for sensing outside ambient temperature and controlling the operation of the sidewall ventilation exhaust fans and tunnel ventilation exhaust fans responsive to the sensed temperature;

(b) at and below a predetermined outside ambient temperature, operating said sidewall ventilation exhaust fans to exhaust air drawn into the animal enclosure through said sidewall ventilation openings while said tunnel ventilation openings are closed and said tunnel ventilation fans are disabled to achieve a relatively low level of powered air movement through the animal enclosure; and (c) above the predetermined outside ambient temperature, closing the sidewall ventilation openings, disabling the sidewall ventilation exhaust fans, opening the tunnel ventilation openings and operating the tunnel ventilation exhaust fans to achieve a relatively high level of powered air movement through the animal enclosure.

* * * * *